United States Patent
Kim et al.

(10) Patent No.: US 12,238,185 B2
(45) Date of Patent: Feb. 25, 2025

(54) GENERATING SERVICE-TO-SERVICE DEPENDENCY MAP FROM DNS AND AUTHENTICATION LOGS

(71) Applicant: Microsoft Technology Licensing, LLC, Redmond, WA (US)

(72) Inventors: George Kim, Fairfax, VA (US); Christian Cypress Chung, Severn, MD (US); Vivek Sanjeev Tejwani, Bellevue, WA (US); Sorabh Kumar Gandhi, Bellevue, WA (US); Abhishek Pathak, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 18/066,235

(22) Filed: Dec. 14, 2022

(65) Prior Publication Data
US 2024/0205300 A1  Jun. 20, 2024

(51) Int. Cl.
| H04L 67/51 | (2022.01) |
| G06F 9/455 | (2018.01) |
| G06F 15/16 | (2006.01) |
| G06F 21/57 | (2013.01) |
| G06F 21/60 | (2013.01) |
| H04L 9/32 | (2006.01) |
| H04L 15/16 | (2006.01) |
| H04L 61/4511 | (2022.01) |

(52) U.S. Cl.
CPC .......... *H04L 67/51* (2022.05); *G06F 9/45558* (2013.01); *H04L 61/4511* (2022.05); *G06F 2009/45595* (2013.01)

(58) Field of Classification Search
CPC ............... H04L 67/51; H04L 61/4511; G06F 9/45558; G06F 2009/45595
USPC ........................................................ 709/224
See application file for complete search history.

(56) References Cited

U.S. PATENT DOCUMENTS

| 8,819,227 | B1 * | 8/2014 | Keralapura | ............. H04L 45/38 |
| | | | | 709/224 |
| 9,571,476 | B1 * | 2/2017 | Silhavy | ................... H04L 63/08 |
| 10,432,471 | B2 | 10/2019 | Gershaft et al. | |

(Continued)

OTHER PUBLICATIONS

International Search Report and Written Opinion received for PCT Application No. PCT/US23/036831, Feb. 22, 2024, 12 pages.

*Primary Examiner* — Emmanuel L Moise
*Assistant Examiner* — Berhanu Shitayewoldetadik
(74) *Attorney, Agent, or Firm* — Alleman Hall & Tuttle LLP

(57) ABSTRACT

A distributed computing system is provided, and configured to execute a domain name service (DNS) log analyzer configured to identify a dependency of a first service executed on a first VM at a first server, on a second service executed on a second VM at a second server, via one or more DNS logs of a DNS server. The system is further configured to execute an authentication log analyzer configured to identify a dependency of the first service on a third service executed at a third server, via the one or more token authentication logs of an authentication server. The system is further configured to execute a dependency map generator configured to generate a service-to-service dependency map including the dependency between the first service and the second service, and the dependency between the first service and third service.

16 Claims, 13 Drawing Sheets

(56) References Cited

U.S. PATENT DOCUMENTS

| | | | |
|---|---|---|---|
| 11,269,711 B2* | 3/2022 | R ........................ | G06F 11/079 |
| 2009/0204696 A1* | 8/2009 | Zhang .................... | H04L 67/62 |
| | | | 709/223 |
| 2013/0173965 A1* | 7/2013 | Son ..................... | G06F 11/3466 |
| | | | 714/E11.029 |
| 2014/0068043 A1* | 3/2014 | Archbold ........... | H04L 61/4511 |
| | | | 709/223 |
| 2014/0082699 A1* | 3/2014 | Eicken ................... | G06F 21/00 |
| | | | 726/4 |
| 2015/0310194 A1* | 10/2015 | Zhang .................... | G06F 21/31 |
| | | | 726/9 |
| 2016/0105325 A1* | 4/2016 | Fletcher ............... | G06F 3/0482 |
| | | | 715/737 |
| 2016/0119437 A1* | 4/2016 | Sylla ..................... | H04L 67/51 |
| | | | 709/224 |
| 2016/0359705 A1* | 12/2016 | Parandehgheibi .... | H04L 43/062 |
| 2017/0063615 A1* | 3/2017 | Yang ..................... | H04L 67/62 |
| 2017/0310770 A1* | 10/2017 | Samaan ................. | H04L 67/53 |
| 2017/0374585 A1* | 12/2017 | Pradas ............... | H04W 36/0033 |
| 2018/0146000 A1* | 5/2018 | Muddu ................ | G06F 16/9024 |
| 2018/0189497 A1* | 7/2018 | Sukhomlinov ......... | G06F 21/50 |
| 2019/0058718 A1 | 2/2019 | Pangeni et al. | |
| 2019/0123899 A1* | 4/2019 | Rutherford ......... | H04L 63/0861 |
| 2019/0171550 A1* | 6/2019 | Eizenman ........... | G06F 11/3664 |
| 2020/0004963 A1* | 1/2020 | Zheng .................... | G06F 21/53 |
| 2020/0007561 A1* | 1/2020 | Muddu .................. | G06N 5/022 |
| 2020/0076701 A1* | 3/2020 | Gershaft ................ | H04L 41/22 |
| 2020/0296007 A1* | 9/2020 | Finn ..................... | H04L 41/145 |
| 2020/0394631 A1* | 12/2020 | Castor ................... | H04L 67/306 |
| 2021/0203732 A1* | 7/2021 | Webb .................. | H04L 43/0817 |
| 2023/0171325 A1* | 6/2023 | Dutra .................. | G06F 11/3636 |
| | | | 709/203 |

* cited by examiner

PASSAGE OF TOKEN FROM FIRST TO THIRD SERVICE

SERVICE-TO-SERVICE DEPENDENCY MAP 64

| TARGET SERVICE 36A (e.g., FIRST SERVICE) | DEPENDENT SERVICES 36B (e.g., SECOND SERVICES) | CATEGORY (BY USAGE) |
|---|---|---|
| | Key Vault Service | CAT 1 |
| | Container Management Service | CAT 1 |
| | Profiler Service | CAT 2 |
| | Resource Manager | CAT 1 |
| | Protection Service | CAT 2 |
| | Diagnostics Service | CAT 3 |
| | Real Time Data Analytics Service | CAT 3 |
| | Master Data Management Service | CAT 2 |
| | Directory Service | CAT 1 |
| | Security Response Service | CAT 2 |
| | Service Bus | CAT 1 |
| | Database Cluster Service | CAT 1 |

DISPLAY [2] ⇳ LEVELS OF DEPENDENCY
41A

FIG. 5

GEOGRAPHIC SCOPE OF DEPENDENT SERVICES 68C
(SERVICE TO GEOGRAPHIC REGION MAP)

| DEPENDENT SERVICES | GEOGRAPHIC REGION | | | | | | | |
|---|---|---|---|---|---|---|---|---|
| | EuropeNorth | EuropeWest | USCentral | USEast | USSouth | USWest | USWest2 | USWestCentral |
| Key Vault Service | | | | | | | | |
| Container Management Service | | | X | | | | | |
| Profiler Service | | | | | | | | |
| Resource Manager | | | | | | X | | |
| Protection Service | | | | X | | X | | |
| Diagnostics Service | | | | | X | X | | |
| Real Time Data Analytics Service | | | | | | X | X | |
| Master Data Management Service | X | | X | | X | | X | X |
| Directory Service | | | | | | | | |
| Security Response Service | | | | | | X | | |
| Service Bus | | | | | | X | | |
| Database Cluster Service | | | | | | | | |

FIG. 8

GENERATING SERVICE-TO-SERVICE DEPENDENCY MAP FROM DNS AND AUTHENTICATION LOGS

BACKGROUND

Modern distributed computing systems include large numbers of servers located at data centers around the world, which communicate with each other across computer networks. Such distributed computing systems offer a plethora of software services that enable developers to develop, configure, deploy, and maintain cloud applications in virtualized environments. A program executed on a particular server can communicate with various AUTHENTICATION of these services executed on other servers, and those services in turn may communicate with other services on yet different servers, and so on. Such communications create dependencies among these services. A failure in one service can affect all services that depend on it. The web of dependencies between such services, and the attendant risks of potential faults due to dependency failures, are exceedingly large in modern distributed computing systems.

SUMMARY

A distributed computing system is provided, and configured to execute a domain name service (DNS) log analyzer configured to identify a dependency of a first service executed on a first virtual machine (VM) at a first server, on a second service executed on a second VM at a second server, via one or more DNS logs of a DNS server. The distributed computing system is further configured to execute an authentication log analyzer configured to identify a dependency of the first service on a third service executed at a third server, via the one or more token authentication logs of an authentication server. The system is further configured to execute a dependency map generator configured to generate a service-to-service dependency map including the dependency between the first service and the second service, and the dependency between the first service and third service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example service-to-service dependency map displayed in a graphical user interface of the computing system of FIG. 1, with category information for each dependent service.

FIG. 8 shows an example of a geographic scope of dependent services created based on a service-to-service dependency map by the computing system of FIG. 1.

DETAILED DESCRIPTION

In a modern globally distributed computing system, millions of servers positioned in data centers distributed throughout various geographic regions may generate billions of service-to-service communications per hour. These communications create dependencies between the requesting service and the service responding to the request. As discussed above, challenges exist to determining service-to-service dependencies. These dependencies vary over time, and their fleeting existence makes them difficult to track. Additionally, some services may be hidden and/or omitted in a conventional dependency map created using domain name service (DNS) log data, as the apparent second service may be a pass-through service rather than a destination service. The sheer volume of such requests, as well as privacy and security measures, also make it difficult to track such dependencies. Further complicating matters, virtualization through container architectures or hypervisor architectures, as described herein, can obfuscate the determination of dependent services. Without an accurate service-to-service dependency map, impact analysis and functions of the platform can be compromised. For example, the true cause of a service outage may remain undiagnosed, critical dependencies may go undetermined which can lead to crashed services being brought back online in an incorrect order that generates dependency failures, legally or contractually determined obligations to house data and services in defined geographic regions can be difficult to meet, verifiable compliance reports can prove difficult to generate, and the true scope of software components affected by a computer virus or malware may be remain unknown. Failure to properly determined service-to-service dependencies in the above example scenarios can lead to decreased performance, increased costs to instantiate new virtual machine (VM) instances to respond to demand, downtime, and potential legal or contractual liabilities.

These potential negative effects can be avoided or mitigated if service-to-service dependencies are quickly and accurately identified.

Figure 1:
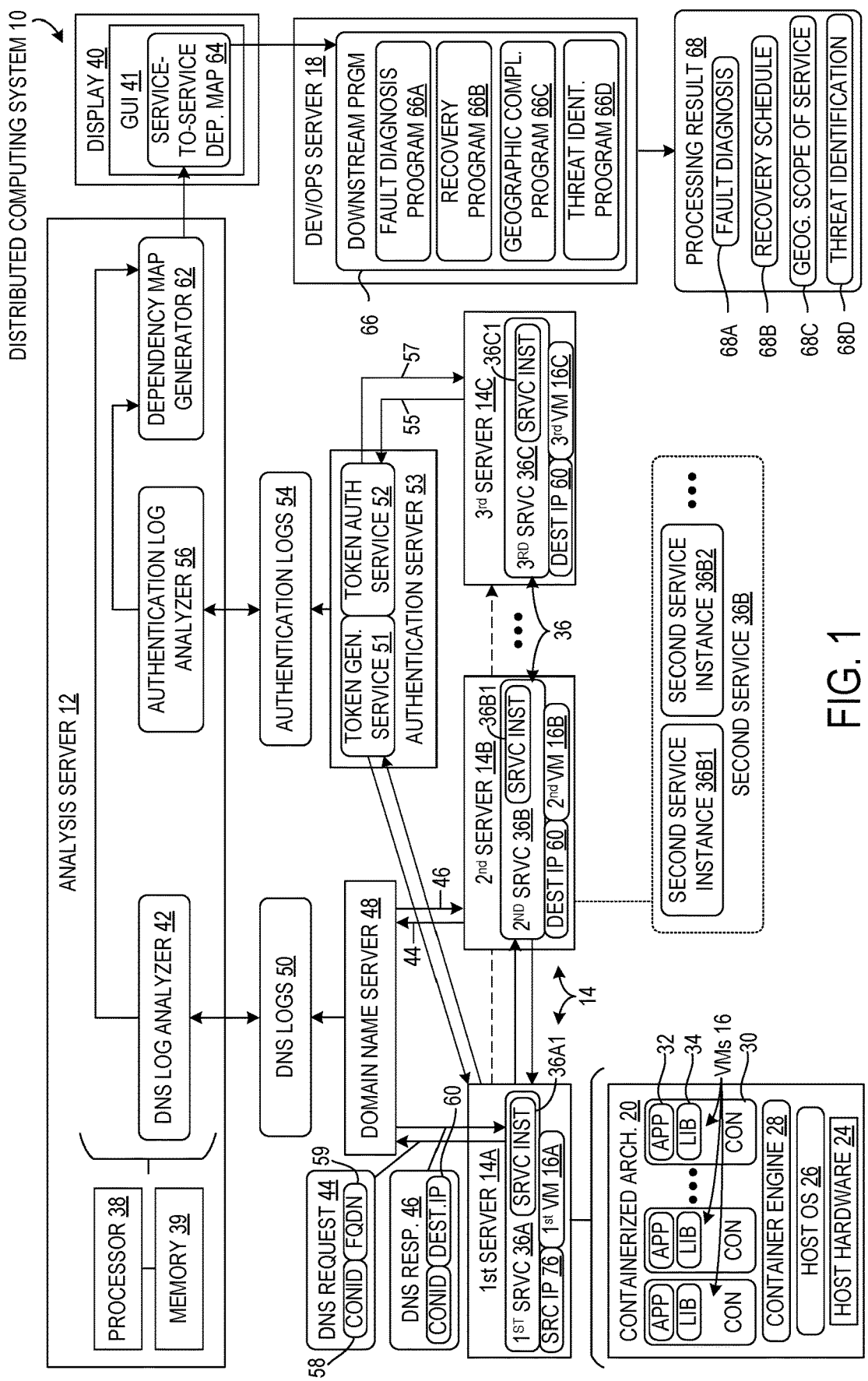
FIG. 1 shows a schematic view of a distributed computing system for use in creating a service-to-service dependency map from domain name service (DNS) logs and authentication logs, according to one example implementation that utilizes servers with containerized architectures.
Figure 2:
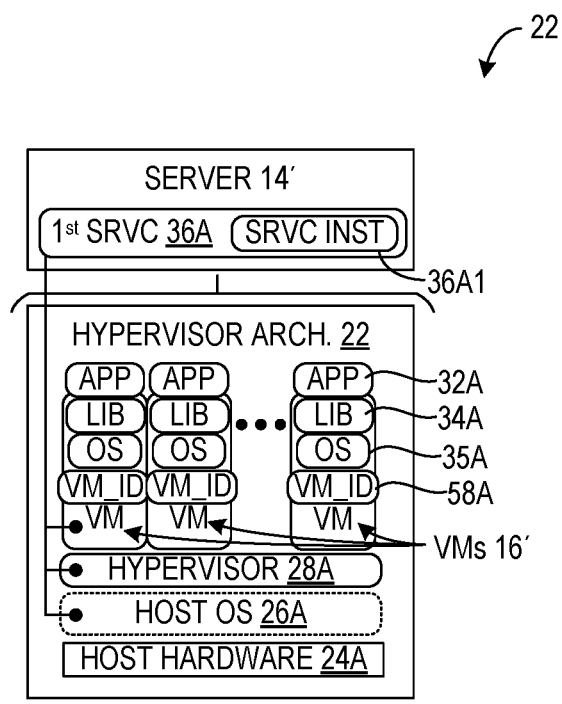
FIG. 2 shows a server with a hypervisor architecture, which may be used as an alternative to the containerized architecture of FIG. 1.

To address these issues, with reference to FIG. 1, a distributed computing system 10 is provided for use in creating a service-to-service dependency map from DNS logs and authentication system logs, according to one example implementation. The distributed computing system 10 includes an analysis server 12 configured to communicate over one or more computer networks with managed servers 14 implementing virtual machines (VMs) 16, and with a development and operations (Dev/Ops) server 18. The virtual machines 16 implemented by each server 14 may be implemented using a containerized architecture 20, as shown in FIG. 1, or a hypervisor architecture 22 as shown in FIG. 2. Continuing with FIG. 1, in the containerized architecture 20, a host operating system 26 is executed on host hardware 24 (e.g., processor, accelerator hardware, non-volatile storage memory, and volatile memory), along with an instance of a container engine 28. The container engine 28 provides a software interface between the host OS and one or more containers 30. Each container 30 includes respective application programs 32, libraries 34, binaries and other data used by the applications. In this way, each container 30 implements a containerized virtual machine 16 within the container.

Turning briefly to FIG. 2, alternatively, server 14' may implement virtualization using a hypervisor architecture 22, which includes a hypervisor 28A executed on a host OS 26A, which in turn is executed on host hardware 24A including a processor and memory. The hypervisor 28A provides a software interface between the host OS 26A and external hypervisor control plane servers, as well as individual virtual machines 16'. Each virtual machine 16' includes a guest OS instance 35A, as well as libraries 34A, binaries, and other data used by applications 32A executed within the hypervised virtual machine 16'. In some implementations host OS 26A may be omitted.

Continuing with FIG. 1, when applications are executed in such virtualized environments as the containerized architecture 20 or the hypervisor architecture 22, various services 36 of the distributed computed system can be called, illustrated schematically as first service 36A, second service 36B, and third service 36C. These services 36 can be called by the applications, libraries, or binaries executed in the virtual machines 16, 16', or by the container engine 28/hypervisor 28A and/or by the host OS 26, 26A in response to requests by software components in the virtual machines 16, 16'. In some cases, a virtual machine 16, 16' is instantiated for the purpose of instantiating a particular service 36 of the distributed computing system, and the application 32 is a program that implements the service 36. It will be appreciated that for each of first through third services 36A, 36B, 36C, a corresponding first through third service instance 36A1, 36B1, 36C1 is instantiated on the first through third servers 14A, 14B, 14C, in response to the requests by first through third virtual machines 16A, 16B, 16C. Further, service instances 36A1-36C1 communicate with each other and other service instances within the distributed computing system 10 over computer networks. As illustrated by second service 36B shown in dashed lines, each service 36 can include a plurality of service instances executed on servers across the distributed computing network.

Figure 3:
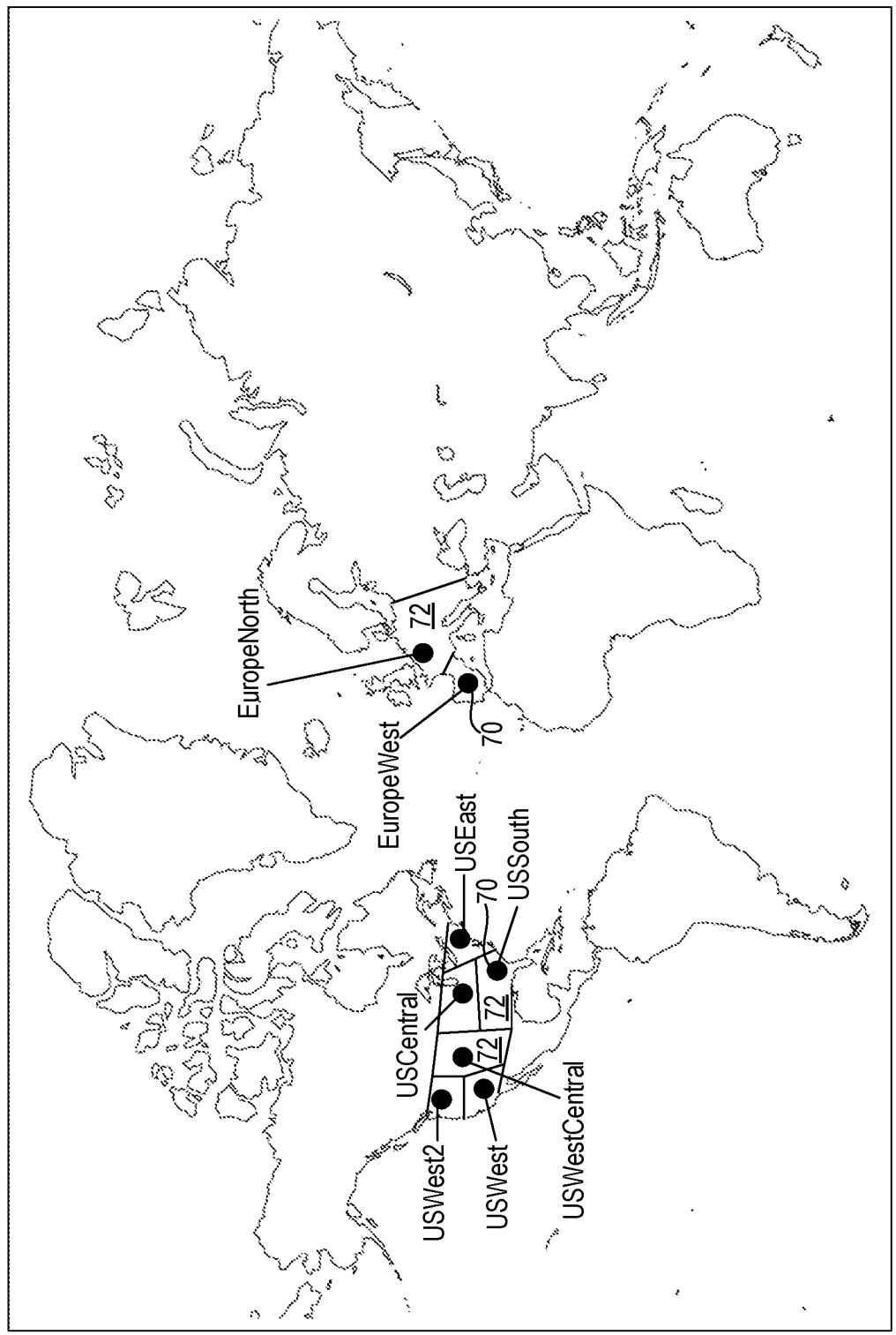
FIG. 3 shows geographic regions in which servers of the distributed computing system of FIG. 1 are deployed, in one example.

In a large deployment of a distributed computing system 10, millions of servers 14 may be provided, and billions of requests per hour may flow between service instances 36A-36C. With such a large and complicated flow of communications, a significant technical challenge exists to monitor dependencies among services. Further, as shown in FIG. 3, the servers 14 of computing system 10 may be located in data centers 70 located in different geographic regions 72. Each of the geographic regions may be subject to different regulatory requirements for the processing and storage of data, including restrictions on the geographic location of data processing and storage of such data. Since data may flow along the dependencies between services, determining that processing of such data is compliant with regulations that restrict geographic scope of data processing and storage in this manner presents a technical challenge. Further, the technical challenges of diagnosing the true origin of a fault in a particular service and generating a recovery schedule for bringing services that depend on each other back online are complicated in such complex distributed computing systems.

Continuing with FIG. 1, to address these technical challenges, the distributed computing system 10 includes an analysis server 12. The analysis server 12 includes a processor 38 and memory 39 storing instructions that cause the processor 38 to execute a domain name service (DNS) log analyzer 42. The DNS log analyzer 42 is configured to identify a dependency of a first service 36A executed on a first VM 16A at a first server 14A of the distributed computing system 10, on a second service 36B executed on a second VM 16B at a second server 14B of the distributed computing system 10, via one or more DNS logs 50 of a DNS server 48 of the distributed computing system 10. It will be appreciated that the second service 36B can be a pass-through service that passes a request from the first service 36A to a third service 36C for processing, and returns a response from the third service 36C to the first service 36A through the second service 36B. The DNS request 44 includes a fully qualified domain name (FQDN) 59 for a service executed at a destination server 14, such as the second service 36B executed at the second server 14B. In one embodiment, the DNS server 48 may be configured to be a recursive resolver that resolves the FQDN 59 to a destination IP address 60. The destination IP address 60 may be either an IPV4 or IPV6 address, for example. The DNS server 48 can thus fully resolve the FQDN 59 into the destination IP address 60, which is returned to the requesting server 14 in a DNS response 46. The DNS log analyzer 42 is also configured to identify the destination IP address 60 associated with a DNS response 46 to the DNS request 44, using one or more DNS logs 50 of the DNS server 48. Because first service 36A sends an HTTP request to the second service 36B, an FQDN 59 for the third service 36C is not contained in the DNS request 44 from the first service 36A and therefore the destination IP address 60 of the third service 36C is not contained in the DNS response 46 thereto. Simply put, the first service 36A is unaware of the third service 36C. It will be appreciated that in addition to the DNS requests 44 and DNS responses 46 themselves, metadata such as a source container identifier 58 or a virtual machine identifier 58A (see FIG. 2) are typically sent from the requesting server 14 to the DNS server 48 in the DNS requests 44 and responses 46, and these metadata are logged in the DNS logs 50, as explained in more detail below with reference to FIG. 4.

It will be appreciated that the DNS log analyzer 42 is capable of identifying a plurality of dependencies of the first service 36A, second service 36B, and third service 36C on a corresponding plurality of other services 14 with which they directly communicate (rather than through pass through services), using the DNS logs 50. As one specific example, the DNS log analyzer 42 may be further configured to identify a dependency between the second service 36B and the third service 36C based on the one or more DNS logs. Other dependencies may also be identified by the DNS log analyzer 42.

Continuing with FIG. 1, distributed computing system 10 further includes a token generation service 51 and a token authentication service 52, which are a software applications typically executed on an authentication server 53 or set of authentication servers 53 and respectively configured to generate and authenticate tokens. Thus, the first service 36A requests generation of a token from the token generation service 51, which returns the generated token in a response, and stores data related to the token generation in token generation logs 54A. The tokens function as access tokens, and can be passed from a requesting service for which they were generated to a destination service to which access is requested. The destination service, such as the third service 36C in FIG. 4, receives the token of the requesting service, such as the first service 36A, and sends the token to the token authentication service 52 of the authentication server 53 for authentication in a token authorization request 55. If the token authentication service 52 responds with an affirmative response 57 confirming the token is valid, then the destination service, such as third service 36C can permit access to gated content, for example. The token service 52 may implement the OAUTH or OAUTH 2.0 authentication protocols, for example. Other protocols may alternatively or additionally be implemented. Information from the token, including an identity of the requesting service 14 or container 30 associated with the token and the identity of the service 14 using the token for authentication, is logged by the token generation service 51 and token authentication service 52 in authentication logs 54.

Distributed computing system 10 further includes an authentication log analyzer 56, which is a software application executed by the analysis server 12 configured to analyze data records in the authentication logs 54. The authentication log analyzer 56 is configured to identify various dependencies, including a dependency of the first service 36A on the third service 36C executed at the third server 14C of the distributed computing system 10, via the one or more token authentication logs 54 of an authentication server of the distributed computing system 10.

The analysis server 12 is further configured to execute a dependency map generator 62, which is a software application configured to generate a service-to-service dependency map 64 including the dependency between the first service 36A and the second service 36B, and the dependency between the first service 36A and third service 36C. As an option, when computed, the dependency between the second service 36B and third service 36C may also be included in the service-to-service dependency map 64. Of course, multiple other dependencies of the first service 36A may also be included, as will be appreciated in view of the examples provided below. The dependency map generator 62 can be configured to determine the second service 36B is a pass-through service by comparing a timeframe of a DNS request 44 from the second service 36B requesting the destination IP address 60 of the third service 36C and a DNS response 46 to this DNS request 44, a timeframe of a DNS request 44 from the first service 36A requesting the destination IP address 60 of the second service 36B, and a timeframe of the authentication request 55 from the third service and authentication response 57 from the token authentication service 52. These timeframes may be determined by inspecting time stamps 61 of the DNS request log records 50A1 and DNS response log records 50B1 for each DNS request 44 and DNS response 46 in the DNS log 50 and the time stamps 61 of the token generation log record 54A1 and authentication request and response log record 54B1 for each token generation request, authentication request 55, and authentication response 57 in in the authentication logs 54.

As described below with respect to FIG. 5, the service-to-service dependency map 64 may be displayed within a graphical user interface (GUI) 41 on a display 40 of the computing system 10. A number of levels of dependency (e.g., up to first order dependencies, up to second order dependencies, up to third order dependency, all dependencies, etc.) displayed in the GUI can be determined by input from a user.

Figure 6:
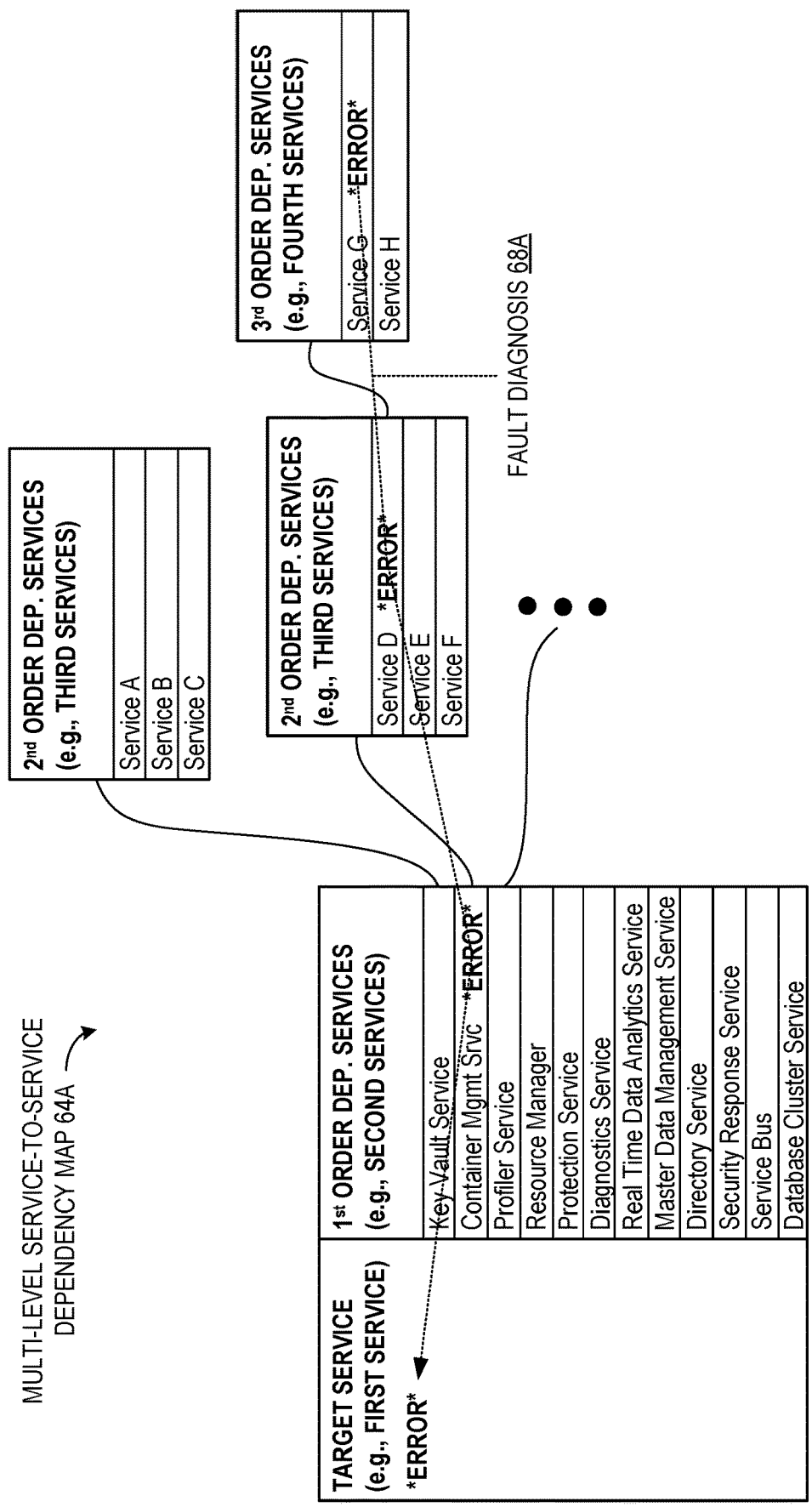
FIG. 6 shows an example multi-level service-to-service dependency map created by the computing system of FIG. 1, with a fault diagnosis created based on the service-to-service dependency map.
Figure 7:
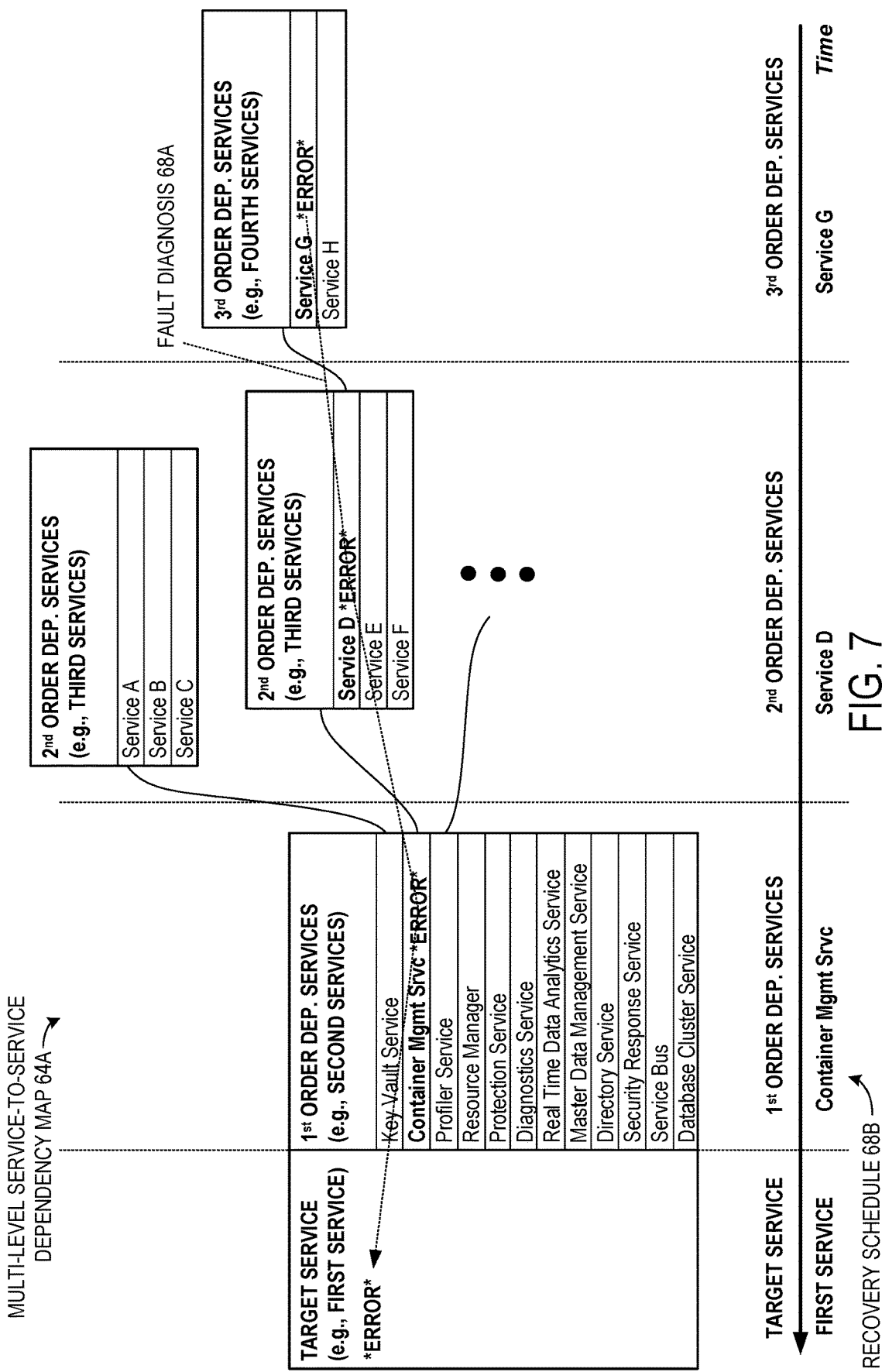
FIG. 7 shows an example multi-level service-to-service dependency map created by the computing system of FIG. 1, with a recovery schedule created based on the service-to-service dependency map.

The dependency map generator 62 is configured to output the service-to-service dependency map 64 to a downstream computing program 66 executed on Dev/Ops server 18 (or other server) for a processing operation. The downstream computing program 66 can be a fault diagnosis program 66A, recovery program 66B, a geographic compliance program 66C, or a threat diagnostics program 66D, for example. Other types of downstream computing programs 66 are also contemplated. The downstream computing program 66 is configured to process the service-to-service dependency map 64 via a processing operation to thereby generate and output a processing result 68. The fault diagnosis program 66A can be configured to generate a fault diagnosis 68A based on the service-to-service dependency map 64 as the processing result 68. The recovery program 64B can be configured to compute a recovery schedule 66B for restarting services based on the service-to-service dependency map 64 as the processing operation. The geographic compliance program 64C can be configured to determine a geographic scope 66C of a location of servers executing the first service 36A and the second service 36A (or, all dependent services on a target service) as the processing result. The threat identification program 66D can be configured to scan system logs of servers 14 executing dependent services of the first service 36A to identify a presence or effect or a virus or malware on the servers 14 as the processing operation, to thereby produce a threat identification 68D. Additional orders of dependency, discussed below, may also be included in the processing result 68. Examples of the fault diagnosis 68A, recovery schedule 68B and geographic scope of services 68C are illustrated in FIGS. 6-8, discussed below.

Figure 4A:
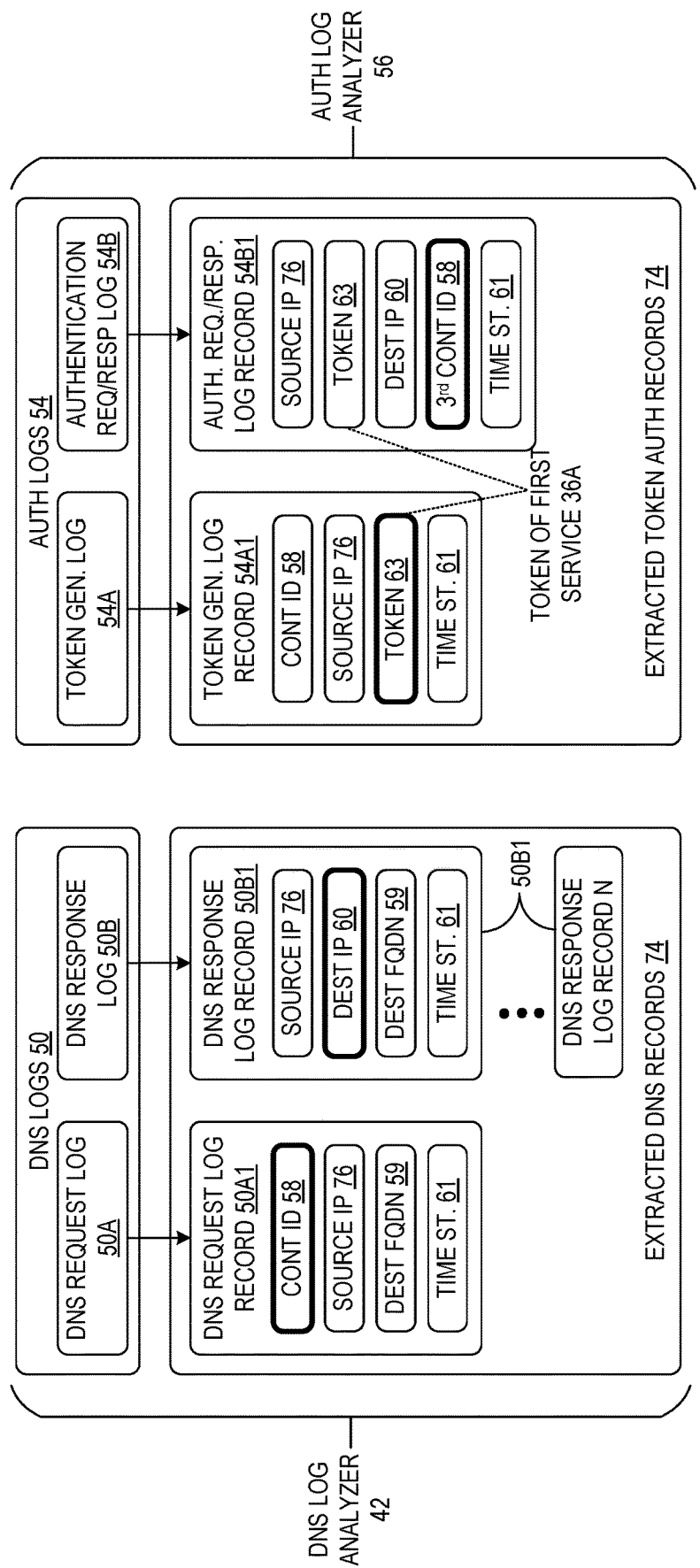
FIG. 4A shows example DNS log records and authentication records utilized by the distributed computing system of FIG. 1 to create the service-to-service dependency map.
Figure 4B:
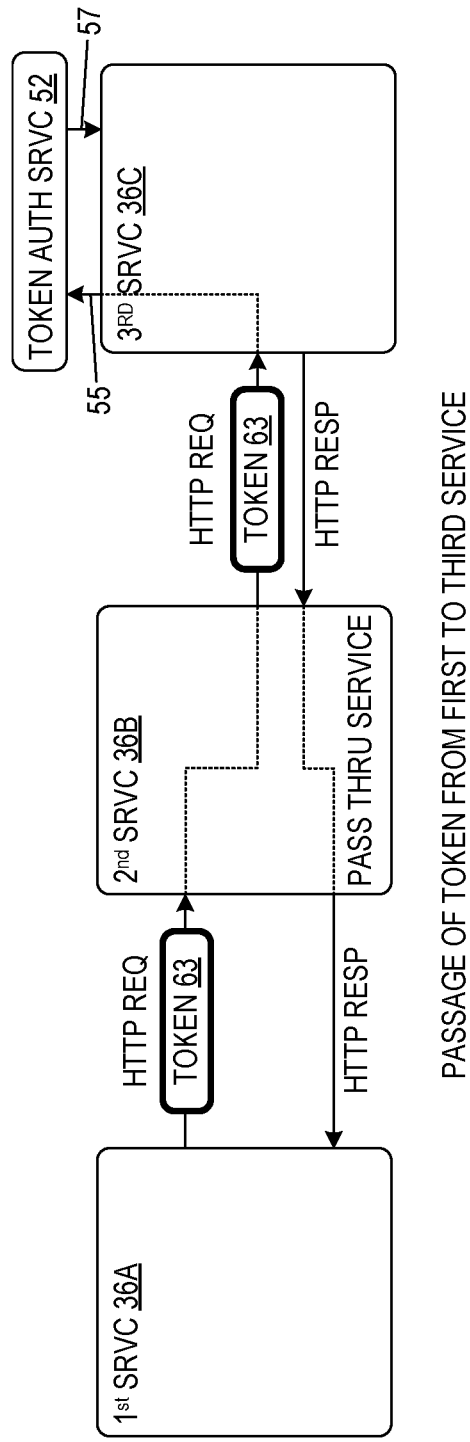
FIG. 4B shows an example route of a token from a first service to a third service of the distributed computing system of FIG. 1.
Figure 4C:
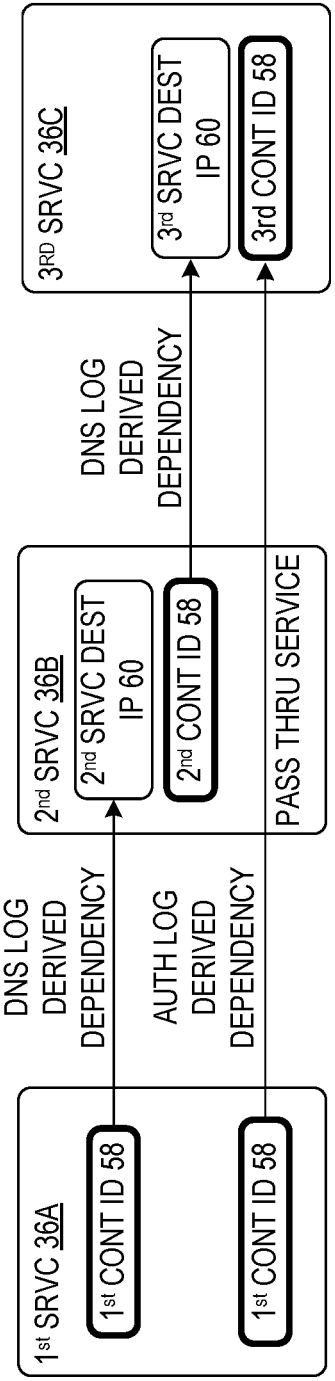
FIG. 4C shows example dependencies derived from DNS logs and authentication logs of the distributed computing system of FIG. 1.

Turning now to FIG. 4A-4C, data relationship diagrams are shown, illustrating in detail the steps undertaken by the analysis server 12 to process the DNS logs 50 and authentication logs 54 to generate the service-to-service dependency 64, when the source identifier is a source container identifier 58 (as illustrated) or a virtual machine identifier 58A. Beginning with FIG. 4A, the DNS log analyzer 42 is configured to extract DNS records 74, which include a DNS request log record 50A1 from the DNS request log 50A and one to N DNS response log records 50B1 associated with the DNS request log record 50A1.

The DNS log analyzer 42 is configured to identify the dependency of the first service 36A on the second service 36B at least in part by performing the following operations. First the DNS log analyzer 42 identifies, within a DNS request log 50A of the one or more DNS logs 50, a DNS request log record 50A1 for a DNS request 44, the DNS request log record 50A1 including a source identifier and a source IP address 76 associated with the first service 36A. The source identifier is determined to be associated with the first service 36A by identifying a VM 16 implementing the first service 36A on the first server 14A that has been assigned the source IP address 76. The source identifier can be a source virtual machine identifier 58A (See FIG. 2) or a source container identifier 58 as shown in FIG. 4A. Alternatively, a different form of source identifier may be used. Second, the DNS log analyzer 42 identifies, within the DNS request log record 50A1 a destination fully qualified domain name (FQDN) 59 requested by the DNS request 44. Third, the DNS log analyzer 42 identifies, within a DNS response log record 50B1 for a DNS response 46 to the DNS request 44, a destination IP address 60 for the destination FQDN 59. A timestamp 61 may be included in each of the DNS request log 50A1 and DNS response log 50B1. Fourth, the DNS log analyzer 42 identifies the second service 36B as being associated with the destination IP address 60, based for example, on an inventory of IP addresses in a service tree data structure maintained by the distributed computing system 10.

Continuing with FIG. 4A, the computing system of claim 1, wherein the authentication log analyzer 56 is configured to identify the dependency between the first service 36A and third service 36C, based on one or more authentication log records (such as token generation log record 54A1 and authentication requestion and response log record 54B1) of authentication logs 54 for an authentication request from the third service 36C to authenticate a token 63 of the first service 36A received via the second service 36B. As shown in FIG. 4A, when a record for an authentication request 54B1 including a third container ID 58 associated with the third service 36C is identified, which also includes a token 63 that matches the token 63 for the first service 36A, then a dependency between of the first service 36A on the third service 36C is established.

The authentication log analyzer 56 is further configured to identify the dependency of the first service 36A on the third service 36B at least in part by performing the following operations. First, authentication log analyzer 56 identifies, within a token generation log 54A of the one or more authentication logs 54, a token generation log record 54A1, the token generation log record 54A1 including the source container identifier 58 (or alternatively the FM identifier 58A) and a globally unique identifier (GUID) as the token 63. The source container identifier 58 is associated with a source container 30 implementing a VM 16 that has been assigned the GUID associated with the token 63 by the token generation service 51. Second, the authentication log analyzer 56 identifies, in the authentication logs 54, a token authentication request 55 from the second service 36B for a token 63 associated with the first service 36B. Third, the authentication log analyzer 56 identifies, within an authentication request and response log 54B of the one or more authentication logs 54, an authentication request and response log record 54B1 for an authentication response 57, the authentication request and response log record 54B1 including a destination identifier (such as a destination container identifier 58 or destination VM identifier 58A) that identifies a VM 16 implementing the third service 36C that requested authentication of the token 63 in authentication request 55, the token 63 including the GUID assigned by the token generation service to the VM 16 implemented by the source container 30.

FIG. 4B illustrates passage of a token 63 of the first service 36A in an HTTP request originating from the first service 36A sent to the second service 36B. Second service 36B, as a pass through service, initiates a separate HTTP request (akin to forwarding the HTTP request of the first service 36A) to the third service 36C, and passes the token of the first service in that HTTP request to the third service. After authentication request 55 is sent to the token authentication service 52 by the third service 36C, and an authentication response 57 indicating validity of the token 63 is received at the third service 36C, then an HTTP response is sent from the third service 36C to the second service 36B, which in turn causes the second service 36B to respond with an HTTP response (for example by passing the HTTP response through) to the first service 36A.

FIG. 4C illustrates different dependencies that are included in the service-to-service dependency map 64 by the dependency map generator 62 in view of the communication exchange of FIG. 4B. As illustrated, service-to-service dependency map 64 may include two DNS log derived dependencies and an authentication log derived dependency based on the communication exchange of FIG. 4B. First, the dependency between the first service 36A and second service 36B, as determined by the dependency identified between the first container ID 58 and the second service 36B destination IP address 60 using the DNS logs 50 can be included. Second, the dependency between the second service 36B and third service 36C, as determined by the dependency identified between the second container ID 58 and the third service 36C destination IP address 60 using the DNS logs 50 can be included. Third, dependency of the first service 36A on the third service 36C, as identified in the authentication logs 54 derived dependency between the first container ID 58 and the third container ID 58, may be included in the service-to-service dependency map 64. In this way, the dependency between the first and third service 36A, 36C, which would not be discoverable from the DNS logs alone with surety, can be identified and mapped.

FIG. 5 illustrates an example service-to-service dependency map 64 created by the computing system 10 of FIG. 1. Although in the examples described above a first service 36A was linked to a second service 36B, in the example of FIG. 5, for a particular target service as the first service 36A, a plurality of second services 36B are identified by the techniques described above as being dependent on the first service 36A. As discussed above, the service-to-service dependency map 64 may be displayed within the GUI 41 on the display 40 of the computing system 10. The GUI 41 may include a selector 41A, and a number of levels of dependency displayed may be determined by input from a user via the selector 41A. Additionally, the displayed service-to-service dependency map indicates a category for each second service upon which the first service is dependent, and the category for each second service can be changed by the user based on optimization function, such as usage, for example. The categories may for example indicate a priority level as determined by usage. It will be appreciated that the viewing and changing of categories is not limited to second services, and that, when additional levels of dependency are displayed, the user may also view and changes the categories assigned to those services. In an alternative configuration, the categories may represent phases in the lifecycle of the first service, such as build time, test time, deployment time, run time, and/or retirement.

FIG. 6 illustrates a multi-level service-to-service dependency map 64A, with a fault diagnosis. Heretofore, first order and second order dependencies have been discussed. First order dependences are illustrated in FIG. 6 at left, and are similar to the dependencies identified in FIG. 5. Each of the first order dependent services is checked for its dependent services using the techniques described above, to identify second order dependent services, i.e., third services. In turn, each of the third services can be analyzed to determine its dependent services, which are third order dependent services, i.e., fourth services, relative to the target service. In this way, a multi-level service-to-service dependency map 64A including a plurality of orders of dependency can be generated.

Such a map can be useful for diagnosing the true cause of service outages. For example, an example fault diagnosis 68A is illustrated in dotted lines, showing how an error detected in the target service can be traced using the service dependency map through the first order dependent service "Container Mgmt Srvc", and through the second order dependent service "Service D", to the third order dependent services "Service G". As Service G has no dependent services, this service can be determined to be the origin of the fault that caused the error experienced by the target service.

The multi-level service-to-service dependency map 64A may be mapped over a lifetime of the identified first service, including build time, test time, deployment time, run time, and retirement. Such a map can be useful for determining services in use that are no longer needed. The deletion unnecessary services may reduce costs associated with executing a service, as well as minimize security issues.

FIG. 7 illustrates a multi-level service-to-service dependency map 64A similar to FIG. 6, and shows how it can be used to generate a recovery schedule 68B. To correct the fault discussed above in relation to FIG. 6, the services can be scheduled for restart in reverse order of dependency. Thus, the third order dependency services that show an error (i.e., Service G) can be scheduled for restarting first, second order dependent services showing an error (i.e., Service D) can be scheduled for restart next, first order dependent services showing an error (i.e., Container Mgmt Srvc) can be restarted next, and finally the target service can be restarted. In this way, at the time of restart, each service will have its dependent services available to it, and post-restart errors will be reduced.

FIG. 8 illustrates an example of a chart indicating a geographic scope of dependent services 68C that can be output by the computing system of FIG. 1. Dependent services of a first service are listed at left in FIG. 8, followed by an indication of the geographic region in which the servers instantiating the server instances implementing the dependent services are located. The locations of the dependent services may be ascertained from the inventory records of the services 36, which can include geographic location information for each destination IP address 59 of each service 36. The geographic scope of dependent services 68C may be used to ensure compliance with regulations governing the geographic location of processing and storage of certain data by the computing system 10.

Figure 9:
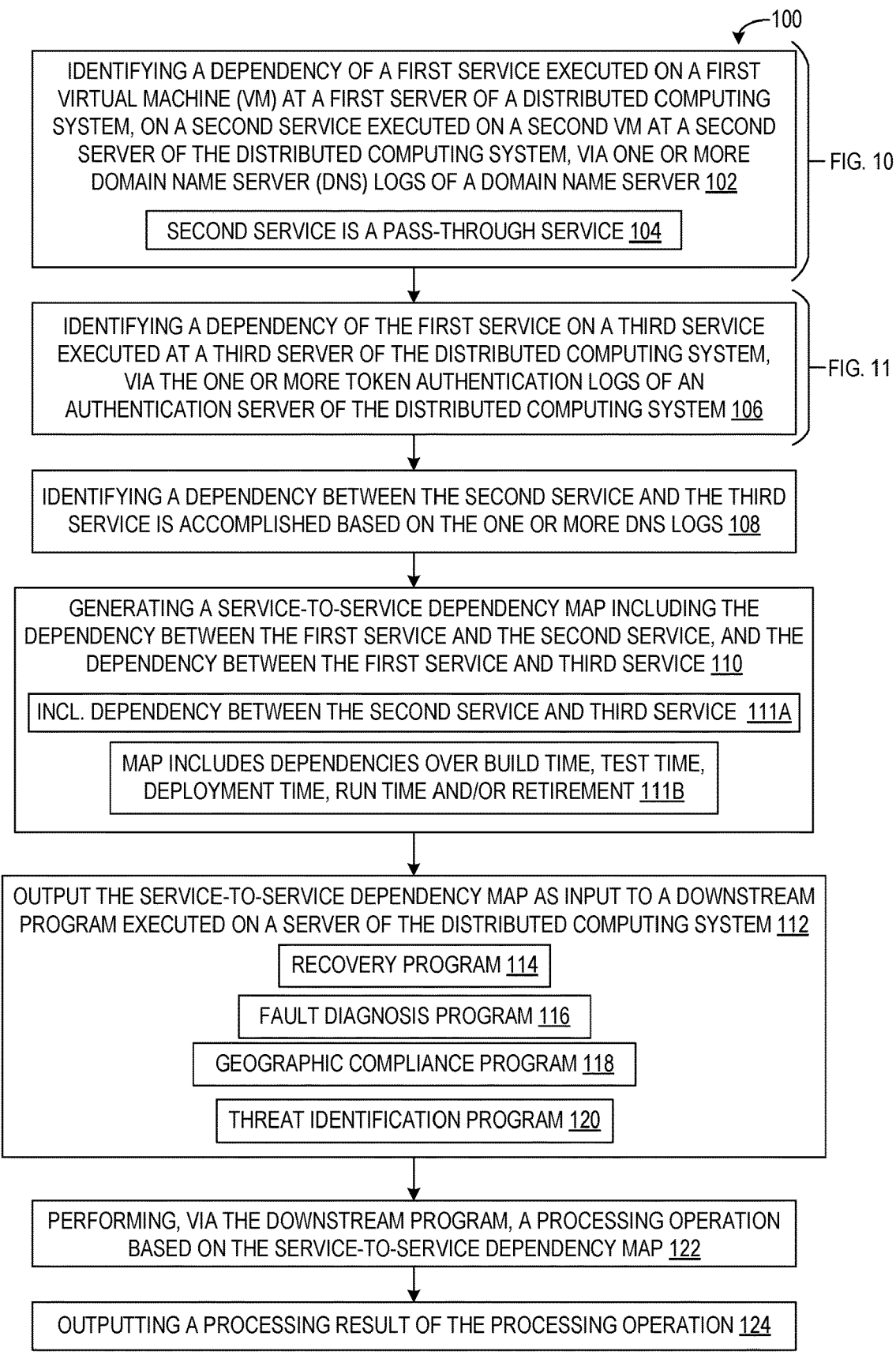
FIG. 9 is a flowchart of a method for use in creating a service-to-service dependency map from domain name service (DNS) logs and authentication logs, according to one example implementation.

Turning now to FIG. 9, a flowchart of a method 100 according to one example implementation of the present disclosure is shown. Method 100 can be implemented using the hardware and software described above, or using other suitable hardware and software, as desired. At 102, the method 100 includes identifying a dependency of a first service executed on a first virtual machine (VM) at a first server of the distributed computing system, on a second service executed on a second VM at a second server of the distributed computing system, via one or more domain name service (DNS) logs of a DNS server of the distributed computing system. As indicated at 104, the second service can be a pass-through service that passes a request from the first service to a third service for processing. The method may include determining that the second service is a pass-through service by comparing a timeframe of a DNS request from the second service requesting the IP address of the third service and a DNS response to this DNS request, a timeframe of a DNS request from the first service requesting the IP address of the second service, and a timeframe of the authentication request from the third service. Further details of substeps that may be performed to implement step 102 are discussed below in FIG. 10.

At 106, the method 100 includes identifying a dependency of the first service on a third service executed at a third server of the distributed computing system, via the one or more token authentication logs of an authentication server of the distributed computing system. It will be appreciated that the source identifier may be a source container identifier or a virtual machine identifier as described above. Further details of substeps that may be performed to implement step 106 are discussed below in FIG. 11.

At 108, method 100 further includes identifying a dependency between the second service and the third service is accomplished based on the one or more DNS logs. The dependency of the second service on the third service may be determined in a similar manner as the dependency of the first service on the second service is at step 102.

At 110, method 100 includes generating a service-to-service dependency map including the dependency between the first service and the second service, and the dependency between the first service and third service. As indicated at 111A, the method 100 may further comprise including the dependency between the second service and third service identified at step 108 in the service-to-service dependency map. As indicated at 111B, method 100 may further include mapping the service-to-service dependency map over a lifetime of the identified first service, including build time, test time, deployment time, run time, and/or retirement such that the service-to-service dependency includes dependencies from each of these different phases.

At 112, method 100 further includes outputting the service-to-service dependency map and inputting it to a downstream program executed on a server of the distributed computing system. As shown at 114, the downstream program can be a recovery program configured to compute a recovery schedule for restarting services based on the service-to-service dependency map as the processing operation. As shown at 116, the downstream program can be a fault diagnosis program configured to generate a fault diagnosis based on the service-to-service dependency map as the processing operation. As shown at 118, the downstream program can be a geographic compliance program configured to determine a geographic scope of a location of servers executing the first service and the second service as the processing operation. As shown at 120, the downstream program can be a threat identification program configured to scan system logs of servers executing dependent services of the first service to identify a presence or effect or a virus or malware on the servers, as the processing operation. Other types of downstream program may also be utilized.

At 122, method 100 further includes performing, via the downstream program, a processing operation, such as the processing operations described above, based on the service-to-service dependency map. At 124, method 100 further includes outputting a processing result of the processing operation. The outputting may include storing the processing result in memory, displaying the processing result on a display, or passing the processing result to a software application for further processing, for example.

Figure 10:
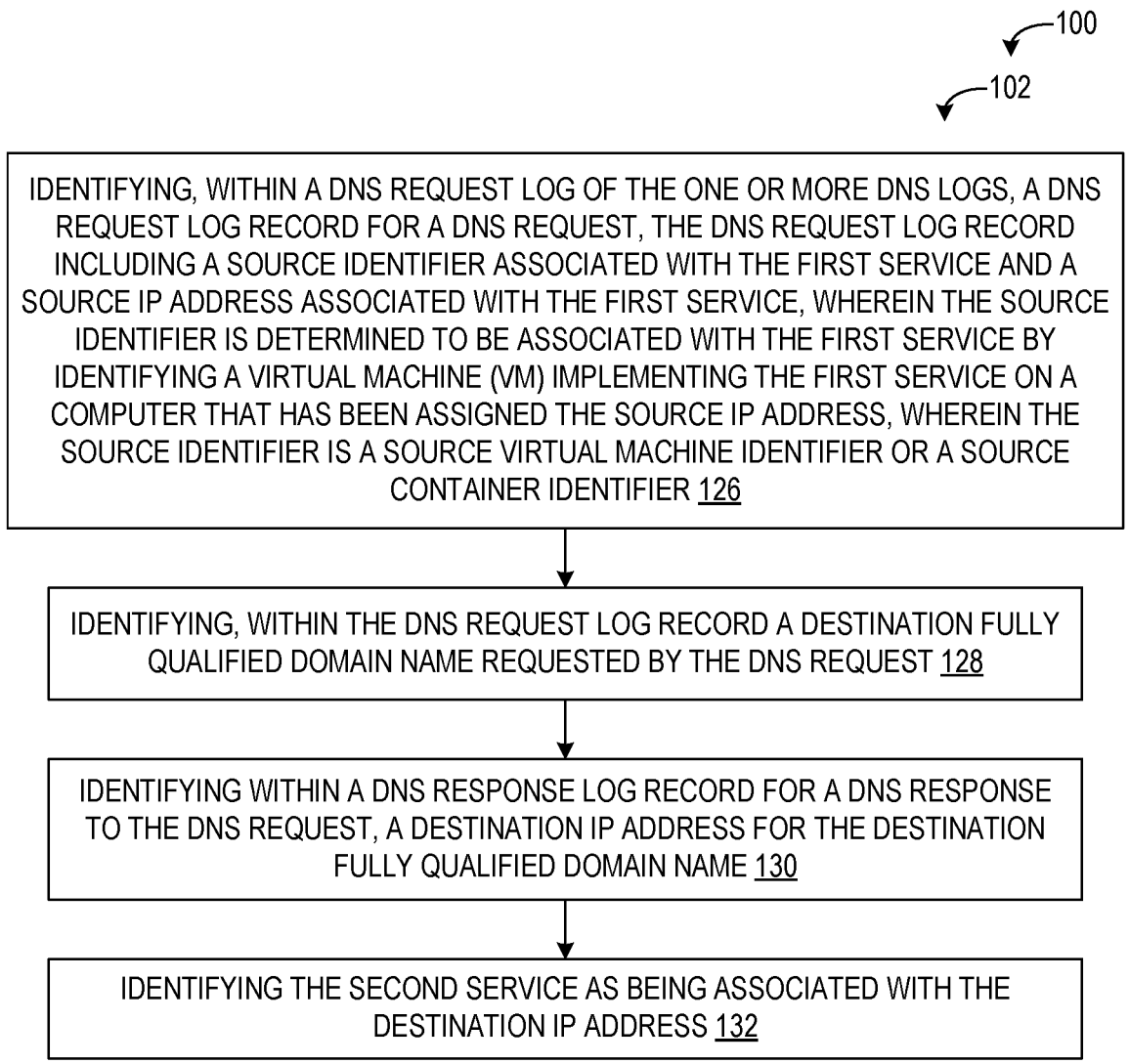
FIG. 10 is a detail view showing substeps of a step in the method of FIG. 9.

As shown in FIG. 10, identifying the dependency of the first service on the second service at step 102 may be accomplished at least in part by performing substeps 126-132. At 126, the method includes identifying, within a DNS request log of the one or more DNS logs, a DNS request log record for a DNS request. The DNS request log record includes a source identifier associated with the first service and a source IP address associated with the first service. The source identifier can be determined to be associated with the first service by identifying a virtual machine (VM) implementing the first service on a computer that has been assigned the source IP address. The source identifier can be a source virtual machine identifier or a source container identifier, for example. At 128, the method includes identifying, within the DNS request log record a destination fully qualified domain name requested by the DNS request. At 130, the method further includes identifying within a DNS response log record for a DNS response to the DNS request, a destination IP address for the destination fully qualified domain name. At 132, the method includes identifying the second service as being associated with the destination IP address.

Figure 11:
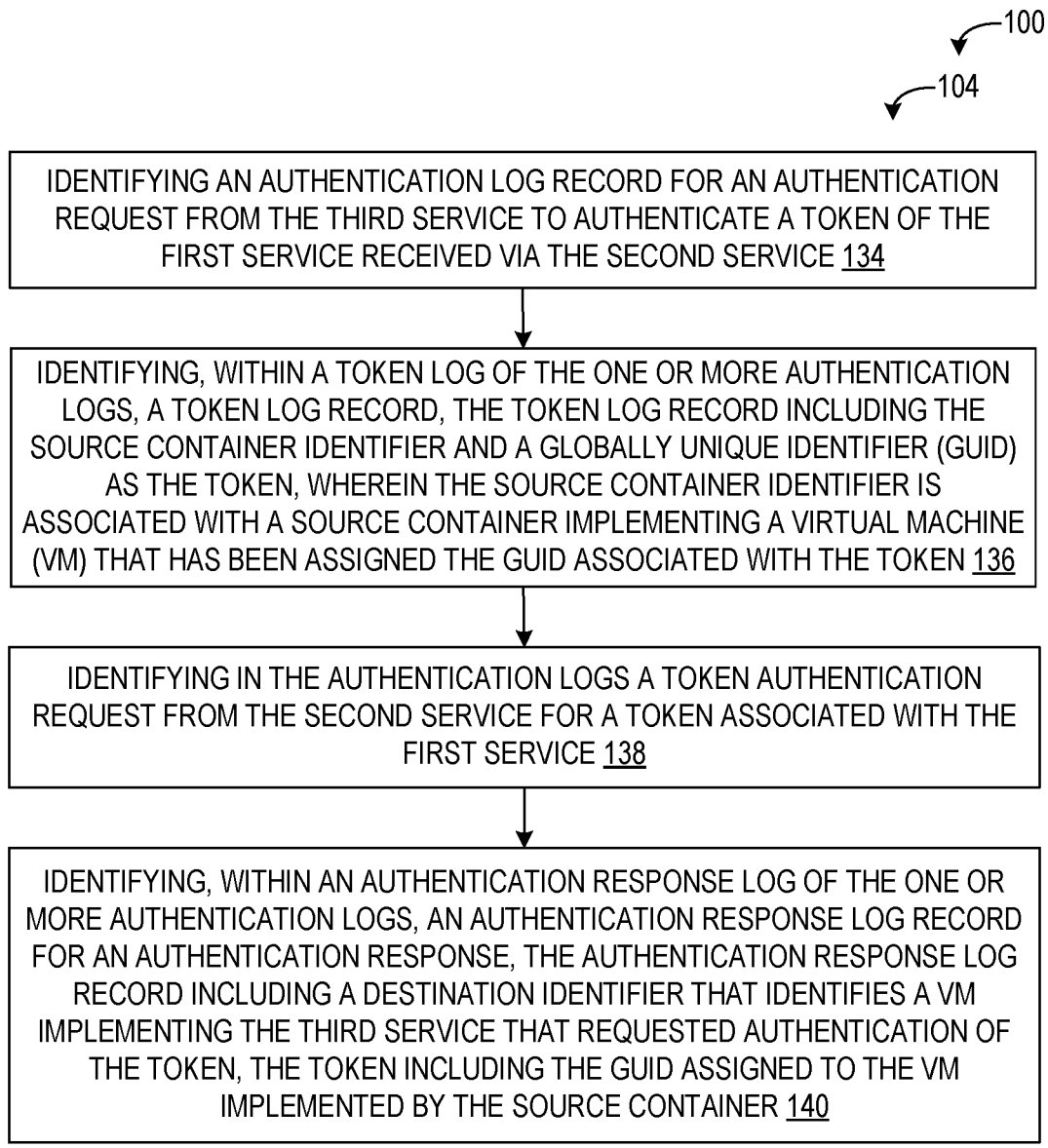
FIG. 11 is a detail view showing substeps of another step in the method of FIG. 9.

Turning now to FIG. 11, identifying the dependency of the first service on the third service of step 104 of FIG. 9 may be accomplished at least in part by performing substeps 134-140 of FIG. 11. At 134, the method includes identifying an authentication log record (such as authentication request and response log record 54B1 discussed above) for an authentication request from the third service to authenticate a token of the first service received via the second service. At 136, the method includes identifying, within a token generation log of the one or more authentication logs, a token generation log record that includes the source container identifier and a globally unique identifier (GUID) as the token. The source container identifier is associated with a source container implementing a virtual machine (VM) that has been assigned the GUID associated with the token. At 138, the method includes identifying in the authentication logs a token authentication request from the second service for a token associated with the first service. At 140, the method includes identifying, within an authentication response log of the one or more authentication logs, an authentication response log record for an authentication response that includes a destination identifier that identifies a VM implementing the third service that requested authentication of the token, the token including the GUID assigned to the VM implemented by the source container.

The systems and methods described above can be used to programmatically and efficiently generate a service-to-service dependency map for services implemented across distributed computing systems with virtualized environments having container or hypervisor architectures. A programmatically generated service-to-service dependency map can be generated for each phase in the lifecycle of an application, such as at build, development, testing, deployment, and retirement phases. Further, the service-to-service dependency map can be kept up to date through periodic automatic updating, to aid in time sensitive fault diagnosis and recovery scheduling. Further, the timing of the service-of-service dependency map can be re-computed with sufficient frequency to aid in regulatory compliance, for example, to geographic restrictions on data storage and processing in certain jurisdictions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
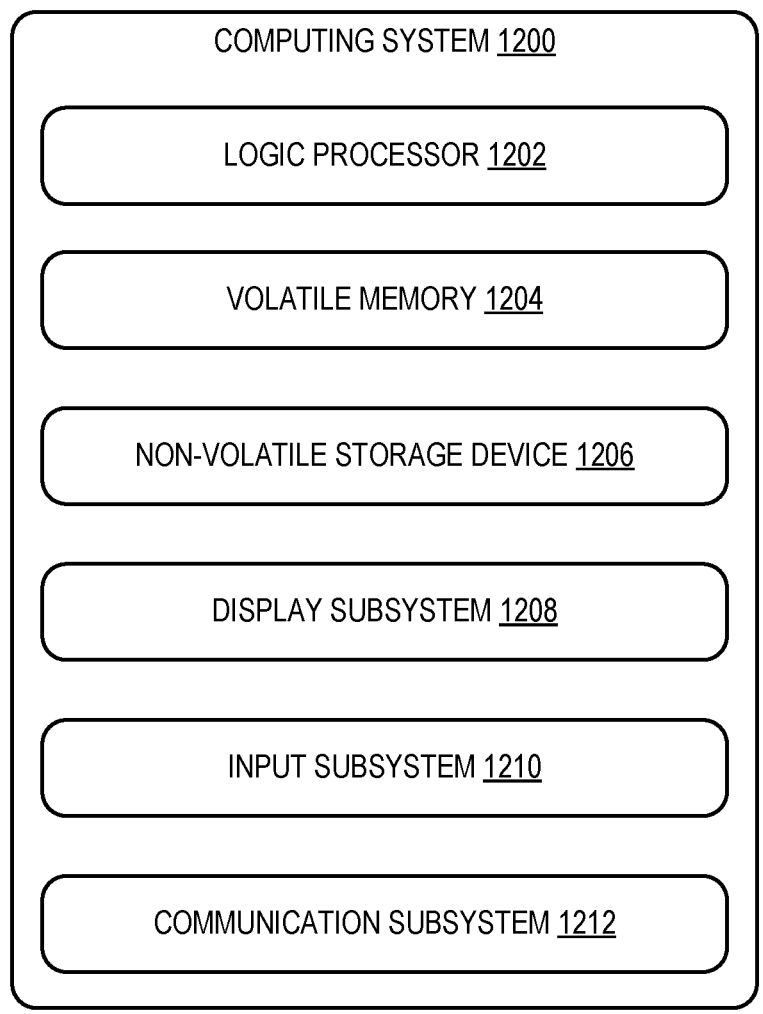
FIG. 12 shows a schematic view of an example computing environment in which the computing system of FIG. 1 may be enacted.

FIG. 12 schematically shows a non-limiting embodiment of a computing system 1200 that can enact one or more of the methods and processes described above. Computing system 1200 is shown in simplified form. Computing system 1200 may embody any of the servers in distributed computing system 10 described above and illustrated in FIGS. 1 and 2.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions.

It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI).

When included, input subsystem 1210 may comprise or interface with one or more user-input devices such as a keyboard, mouse, touch screen, camera, and microphone.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wired or wireless local- or wide-area network. In some embodiments, the communication subsystem may allow computing system 1200 to send and/or receive messages to and/or from other devices via a network such as the Internet.

The following paragraphs provide additional description of aspects of the present disclosure. One aspect provides a distributed computing system. The distributed computing system may comprise a processor and memory storing instructions that may cause the processor to execute a domain name service (DNS) log analyzer, an authentication log analyzer, and a dependency map generator. The DNS log analyzer may be configured to identify a dependency of a first service executed on a first virtual machine (VM) at a first server of the distributed computing system, on a second service executed on a second VM at a second server of the distributed computing system, via one or more DNS logs of a DNS server of the distributed computing system. The authentication log analyzer may be configured to identify a dependency of the first service on a third service executed at a third server of the distributed computing system, via one or more token authentication logs of an authentication server of the distributed computing system. The dependency map generator may be configured to generate a service-to-service dependency map including the dependency between the first service and the second service, and the dependency between the first service and third service.

In this aspect, additionally or alternatively, the second service may be a pass-through service that passes a request from the first service to a third service for processing. In this aspect, additionally or alternatively, the authentication log analyzer may be further configured to identify a dependency between the second service and the third service based on the one or more DNS logs, and the dependency between the second service and third service may be included in the service-to-service dependency map.

In this aspect, additionally or alternatively, the DNS log analyzer may be configured to identify the dependency of the first service on the second service by: identifying, within a DNS request log of the one or more DNS logs, a DNS request log record for a DNS request, the DNS request log record including a source identifier associated with the first service and a source IP address associated with the first service, wherein the source identifier may be determined to be associated with the first service by identifying a virtual machine (VM) implementing the first service on a computer that has been assigned the source IP address, wherein the source identifier may be a source virtual machine identifier or a source container identifier; identifying, within the DNS request log record a destination fully qualified domain name requested by the DNS request; identifying within a DNS response log record for a DNS response to the DNS request, a destination IP address for the destination fully qualified domain name; and identifying the second service as being associated with the destination IP address.

In this aspect, additionally or alternatively, the authentication log analyzer may be configured to identify the dependency between the first service and third service, based on an authentication log record for an authentication request from the third service to authenticate a token of the first service received via the second service.

In this aspect, additionally or alternatively, the authentication log analyzer may be further configured to identify the dependency of the first service on the third service at least in part by: identifying, within a token generation log of the one or more authentication logs, a token generation log record, the token generation log record including the source container identifier and a globally unique identifier (GUID) as the token, wherein the source container identifier may be associated with a source container implementing a virtual machine (VM) that has been assigned the GUID associated with the token; identifying in the authentication logs a token authentication request from the second service for a token associated with the first service; and identifying, within an authentication response log of the one or more authentication logs, an authentication response log record for an authentication response, the authentication response log record including a destination identifier that identifies a VM implementing the third service that requested authentication of the token, the token including the GUID assigned to the VM implemented by the source container.

In this aspect, additionally or alternatively, the dependency map generator may be further configured to determine the second service may be a pass-through service by comparing a timeframe of a DNS request from the second service requesting the IP address of the third service and a DNS response to this DNS request, a timeframe of a DNS request from the first service requesting the IP address of the second service, and a timeframe of the authentication request from the third service.

In this aspect, additionally or alternatively, the service-to-service dependency map may be output to a downstream computing program for processing, and the downstream program may be selected from the group consisting of a recovery program configured to compute a fault diagnosis program configured to generate a fault diagnosis based on the service-to-service dependency map as the processing operation, a recovery schedule for restarting services based on the service-to-service dependency map as the processing operation, a geographic compliance program configured to determine a geographic scope of a location of servers executing the first service and the second service as the processing operation, and a threat identification program configured to scan system logs of servers executing dependent services of the first service to identify a presence or effect or a virus or malware on the servers as the processing operation.

In this aspect, additionally or alternatively, the computing system may be configured to display the service-to-service dependency map within a graphical user interface, and a number of levels of dependency displayed may be determined by input from a user. In this aspect, additionally or alternatively, the service-to-service dependency map may be mapped over a lifetime of the identified first service, including build time, test time, deployment time, run time, and retirement.

Another aspect provides a computing method for a distributed computing system. The method may comprise identifying a dependency of a first service executed on a first virtual machine (VM) at a first server of the distributed computing system, on a second service executed on a second VM at a second server of the distributed computing system, via one or more domain name service (DNS) logs of a DNS server of the distributed computing system; identifying a dependency of the first service on a third service executed at a third server of the distributed computing system, via one or more token authentication logs of an authentication server of the distributed computing system; and generating a service-to-service dependency map including the dependency between the first service and the second service, and the dependency between the first service and third service.

In this aspect, additionally or alternatively, the second service may be a pass-through service that passes a request from the first service to a third service for processing. In this aspect, additionally or alternatively, the method may further comprise identifying a dependency between the second service and the third service based on the one or more DNS logs; and including the dependency between the second service and third service in the service-to-service dependency map.

In this aspect, additionally or alternatively, identifying the dependency of the first service on the second service may be accomplished at least in part by: identifying, within a DNS request log of the one or more DNS logs, a DNS request log record for a DNS request, the DNS request log record including a source identifier associated with the first service and a source IP address associated with the first service, wherein the source identifier may be determined to be associated with the first service by identifying a virtual machine (VM) implementing the first service on a computer that has been assigned the source IP address, wherein the source identifier may be a source virtual machine identifier or a source container identifier; identifying, within the DNS request log record a destination fully qualified domain name requested by the DNS request; identifying within a DNS response log record for a DNS response to the DNS request, a destination IP address for the destination fully qualified domain name; and identifying the second service as being associated with the destination IP address.

In this aspect, additionally or alternatively, identifying the dependency of the first service on the third service may be accomplished at least in part by identifying an authentication log record for an authentication request from the third service to authenticate a token of the first service received via the second service.

In this aspect, additionally or alternatively, identifying the dependency of the first service on the third service may be at least in part accomplished by: identifying, within a token generation log of the one or more authentication logs, a token generation log record, the token generation log record including the source container identifier and a globally unique identifier (GUID) as the token, wherein the source container identifier may be associated with a source container implementing a virtual machine (VM) that has been assigned the GUID associated with the token; identifying in the authentication logs a token authentication request from the second service for a token associated with the first service; and identifying, within an authentication response log of the one or more authentication logs, an authentication response log record for an authentication response, the authentication response log record including a destination identifier that identifies a VM implementing the third service that requested authentication of the token, the token including the GUID assigned to the VM implemented by the source container.

In this aspect, additionally or alternatively, the method may further comprise determining the second service may be a pass-through service by comparing a timeframe of a DNS request from the second service requesting the IP address of the third service and a DNS response to this DNS request, a timeframe of a DNS request from the first service requesting the IP address of the second service, and a timeframe of the authentication request from the third service.

In this aspect, additionally or alternatively, the method may further comprise outputting the service-to-service dependency map to a downstream computing program for processing, wherein the downstream program may be selected from the group consisting of a recovery program configured to compute a recovery schedule for restarting services based on the service-to-service dependency map as the processing operation, a fault diagnosis program configured to generate a fault diagnosis based on the service-to-service dependency map as the processing operation, a geographic compliance program configured to determine a geographic scope of a location of servers executing the first service and the second service as the processing operation, and a threat identification program configured to scan system logs of servers executing dependent services of the first service to identify a presence or effect or a virus or malware on the servers.

In this aspect, additionally or alternatively, the method may further comprise mapping the service-to-service dependency map over a lifetime of the identified first service, including build time, test time, deployment time, run time, and retirement.

Another aspect provides a computing method for a distributed computing system. The method may comprise identifying a dependency of a first service executed on a first virtual machine (VM) at a first server of the distributed computing system, on a second service executed on a second virtual machine at a second server of the distributed computing system, via one or more domain name service (DNS) logs of a DNS server of the distributed computing system, wherein the second service may be a pass-through service that passes a request from the first service to a third service for processing; identifying a dependency of the first service on the third service executed at a third server of the distributed computing system, via one or more token authentication logs of an authentication server of the distributed computing system; identifying a dependency between the second service and the third service based on the one or more DNS logs; generating a service-to-service dependency map including the dependency between the first service and the second service, the dependency between the second and third service, and the dependency between the first service and third service; outputting the service-to-service dependency map as input to a downstream program executed on a server of the distributed computing system; performing, via the downstream program, a processing operation based on the service-to-service dependency map; and outputting a processing result of the processing operation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A distributed computing system, comprising:
a processor and memory storing instructions that cause the processor to execute:
    a domain name service (DNS) log analyzer configured to identify a dependency of a first service executed on a first virtual machine (VM) at a first server of the distributed computing system, on a second service executed on a second VM at a second server of the distributed computing system, via one or more DNS logs of a DNS server of the distributed computing system;
    an authentication log analyzer configured to identify a dependency of the first service on a third service executed at a third server of the distributed computing system, via one or more token authentication logs of an authentication server of the distributed computing system; and
    a dependency map generator configured to generate a service-to-service dependency map including the dependency between the first service and the second service identified via the DNS log analyzer, and the dependency between the first service and third service identified via the authentication log analyzer, wherein
    the DNS log analyzer is further configured to identify a dependency between the second service and the third service based on the one or more DNS logs,
    the second service is a pass-through service that passes a request from the first service to the third service for processing,
    the dependency between the second service and the third service identified via the DNS log analyzer is included in the service-to-service dependency map,
    the service-to-service dependency map is output to a downstream computing program for processing, the downstream computing program being selected from the group consisting of a recovery program, a fault diagnosis program, a geographic compliance program, and a threat identification program,
    the geographic compliance program is configured to determine a geographic scope of a location of servers executing the first service and the second service as the processing operation, and
    the threat identification program is configured to scan system logs of servers executing dependent services of the first service to identify a presence or effect or a virus or malware on the servers as the processing operation.

2. The computing system of claim 1, wherein
the DNS log analyzer is configured to identify the dependency of the first service on the second service by:
    identifying, within a DNS request log of the one or more DNS logs, a DNS request log record for a DNS request, the DNS request log record including a source identifier associated with the first service and a source IP address associated with the first service, wherein the source identifier is determined to be associated with the first service by identifying a virtual machine (VM) implementing the first service on a computer that has been assigned the source IP address, wherein the source identifier is a source virtual machine identifier or a source container identifier,
    identifying, within the DNS request log record a destination fully qualified domain name requested by the DNS request,
    identifying within a DNS response log record for a DNS response to the DNS request, a destination IP address for the destination fully qualified domain name, and
    identifying the second service as being associated with the destination IP address.

3. The computing system of claim 1, wherein the authentication log analyzer is configured to identify the dependency between the first service and third service, based on an authentication log record for an authentication request from the third service to authenticate a token of the first service received via the second service.

4. The computing system of claim 3, wherein
the authentication log analyzer is further configured to identify the dependency of the first service on the third service at least in part by:
    identifying, within a token generation log of the one or more authentication logs, a token generation log record, the token generation log record including the source container identifier and a globally unique identifier (GUID) as the token, wherein the source container identifier is associated with a source container implementing a virtual machine (VM) that has been assigned the GUID associated with the token;
    identifying in the authentication logs a token authentication request from the second service for a token associated with the first service; and
    identifying, within an authentication response log of the one or more authentication logs, an authentication response log record for an authentication response, the authentication response log record including a destination identifier that identifies a VM implementing the third service that requested authentication of the token, the token including the GUID assigned to the VM implemented by the source container.

5. The computing system of claim 3, wherein the dependency map generator is further configured to:
determine the second service is a pass-through service by comparing a timeframe of a DNS request from the second service requesting the IP address of the third service and a DNS response to this DNS request, a timeframe of a DNS request from the first service requesting the IP address of the second service, and a timeframe of the authentication request from the third service.

6. The computing system of claim 1, wherein
the recovery program is configured to compute a recovery schedule for restarting services based on the service-to-service dependency map as the processing operation, and
the fault diagnosis program is configured to generate a fault diagnosis based on the service-to-service dependency map as the processing operation.

7. The computing system of claim 1, wherein
the computing system is configured to display the service-to-service dependency map within a graphical user interface, and
a number of levels of dependency displayed is determined by input from a user.

8. The computing system of claim 1, wherein
the service-to-service dependency map is mapped over a lifetime of the identified first service, including build time, test time, deployment time, run time, and retirement.

9. A computing method for a distributed computing system, comprising:
identifying a dependency of a first service executed on a first virtual machine (VM) at a first server of the distributed computing system, on a second service executed on a second VM at a second server of the distributed computing system, via one or more domain name service (DNS) logs of a DNS server of the distributed computing system;
identifying a dependency of the first service on a third service executed at a third server of the distributed computing system, via one or more token authentication logs of an authentication server of the distributed computing system;
identifying a dependency between the second service and the third service based on the one or more DNS logs, the second service being a pass-through service that passes a request from the first service to the third service for processing;
generating a service-to-service dependency map including the dependency between the first service and the second service, the dependency between the second service and the third service, and the dependency between the first service and third service; and
outputting the service-to-service dependency map to a downstream computing program for processing, the downstream computing program being selected from the group consisting of a recovery program, a fault diagnosis program, a geographic compliance program, and a threat identification program, wherein the geographic compliance program is configured to determine a geographic scope of a location of servers executing the first service and the second service as the processing operation, and
the threat identification program is configured to scan system logs of servers executing dependent services of the first service to identify a presence or effect or a virus or malware on the servers as the processing operation.

10. The computing method of claim 9, wherein
identifying the dependency of the first service on the second service is accomplished at least in part by:
identifying, within a DNS request log of the one or more DNS logs, a DNS request log record for a DNS request, the DNS request log record including a source identifier associated with the first service and a source IP address associated with the first service, wherein the source identifier is determined to be associated with the first service by identifying a virtual machine (VM) implementing the first service on a computer that has been assigned the source IP address, wherein the source identifier is a source virtual machine identifier or a source container identifier,
identifying, within the DNS request log record a destination fully qualified domain name requested by the DNS request,
identifying within a DNS response log record for a DNS response to the DNS request, a destination IP address for the destination fully qualified domain name, and
identifying the second service as being associated with the destination IP address.

11. The computing method of claim 9, wherein
identifying the dependency of the first service on the third service is accomplished at least in part by, identifying an authentication log record for an authentication request from the third service to authenticate a token of the first service received via the second service.

12. The computing method of claim 11, wherein
identifying the dependency of the first service on the third service is at least in part accomplished by:
identifying, within a token generation log of the one or more authentication logs, a token generation log record, the token generation log record including the source container identifier and a globally unique identifier (GUID) as the token, wherein the source container identifier is associated with a source container implementing a virtual machine (VM) that has been assigned the GUID associated with the token;
identifying in the authentication logs a token authentication request from the second service for a token associated with the first service; and
identifying, within an authentication response log of the one or more authentication logs, an authentication response log record for an authentication response, the authentication response log record including a destination identifier that identifies a VM implementing the third service that requested authentication of the token, the token including the GUID assigned to the VM implemented by the source container.

13. The computing method of claim 9, the method further comprising:
determining the second service is a pass-through service by comparing a timeframe of a DNS request from the second service requesting the IP address of the third service and a DNS response to this DNS request, a timeframe of a DNS request from the first service requesting the IP address of the second service, and a timeframe of the authentication request from the third service.

14. The computing method of claim 13, wherein
the recovery program is configured to compute a recovery schedule for restarting services based on the service-to-service dependency map as the processing operation, and
the fault diagnosis program is configured to generate a fault diagnosis based on the service-to-service dependency map as the processing operation.

15. The computing method of claim 9, the method further comprising:
mapping the service-to-service dependency map over a lifetime of the identified first service, including build time, test time, deployment time, run time, and retirement.

16. A computing method for a distributed computing system, comprising:
identifying a dependency of a first service executed on a first virtual machine (VM) at a first server of the distributed computing system, on a second service executed on a second virtual machine at a second server of the distributed computing system, via one or more domain name service (DNS) logs of a DNS server of the distributed computing system, wherein the second service is a pass-through service that passes a request from the first service to a third service for processing;
identifying a dependency of the first service on the third service executed at a third server of the distributed computing system, via one or more token authentication logs of an authentication server of the distributed computing system;
identifying a dependency between the second service and the third service based on the one or more DNS logs;
generating a service-to-service dependency map including the dependency between the first service and the second service, the dependency between the second and third service, and the dependency between the first service and third service;
outputting the service-to-service dependency map as input to a downstream computing program executed on a server of the distributed computing system;
performing, via the downstream computing program, a processing operation based on the service-to-service dependency map; and
outputting a processing result of the processing operation, wherein
the downstream computing program is selected from the group consisting of a recovery program, a fault diagnosis program, a geographic compliance program, and a threat identification program, wherein
the geographic compliance program is configured to determine a geographic scope of a location of servers executing the first service and the second service as the processing operation, and
the threat identification program is configured to scan system logs of servers executing dependent services of the first service to identify a presence or effect or a virus or malware on the servers as the processing operation.

* * * * *